United States Patent [19]

Kiyokawa

[11] Patent Number: 4,497,029
[45] Date of Patent: Jan. 29, 1985

[54] NUMERICAL CONTROL DEVICE

[75] Inventor: Morio Kiyokawa, Nagoya, Japan

[73] Assignee: Mitsubishi Denki Kabushiki Kaisha, Tokyo, Japan

[21] Appl. No.: 367,607

[22] Filed: Apr. 12, 1982

[30] Foreign Application Priority Data

Apr. 15, 1981 [JP] Japan .................................. 56-56779

[51] Int. Cl.³ .............................................. G06F 15/46
[52] U.S. Cl. ..................................... 364/474; 364/170; 364/184; 29/568; 318/563; 318/572; 318/632
[58] Field of Search ............... 364/167, 170, 171, 184, 364/185, 474, 475, 513; 318/572, 632, 563, 565; 29/568; 414/730

[56] References Cited

U.S. PATENT DOCUMENTS

| | | | |
|---|---|---|---|
| 4,045,660 | 8/1977 | Weisgerber et al. | 318/632 |
| 4,107,589 | 8/1978 | Eto et al. | 29/568 |
| 4,109,188 | 8/1978 | Shima et al. | 29/568 |
| 4,173,817 | 11/1979 | Voglrider et al. | 29/568 |
| 4,185,376 | 1/1980 | Johnstone | 29/568 |
| 4,214,191 | 7/1980 | Watanabe et al. | 29/568 |
| 4,268,949 | 5/1981 | Sato | 29/568 |
| 4,277,880 | 7/1981 | Utsumi | 29/568 |
| 4,288,849 | 9/1981 | Yoshida et al. | 364/167 |
| 4,355,446 | 10/1982 | Shimajiri et al. | 29/568 |
| 4,404,506 | 9/1983 | Nishimura et al. | 29/568 |

Primary Examiner—Jerry Smith
Assistant Examiner—John R. Lastova
Attorney, Agent, or Firm—Wenderoth, Lind & Ponack

[57] ABSTRACT

A numerical control device for controlling a machine tool automatically selects the tool of the specified kind from among a plurality of tools of the same kind disposed in the magazine locations or holders. The numerical control device includes registers for storing the kinds and the lives of the tools disposed in respective magazine locations. Thus, when a tool select command specifying a tool kind is inputted, the magazine location in which the tool of the specified kind having a remaining life is selected by studying the contents of the registers in sequential order. The device further includes registers for storing adjustment values of the tools in the magazine locations, and thus can automatically effect the adjustment operation of the newly selected tool. Preferably, the device includes a tool damage detector and automatically changes the tool in use when it is damaged or reaches the end of its life in the middle of the machining operation.

16 Claims, 12 Drawing Figures

FIG. I

FIG. 6
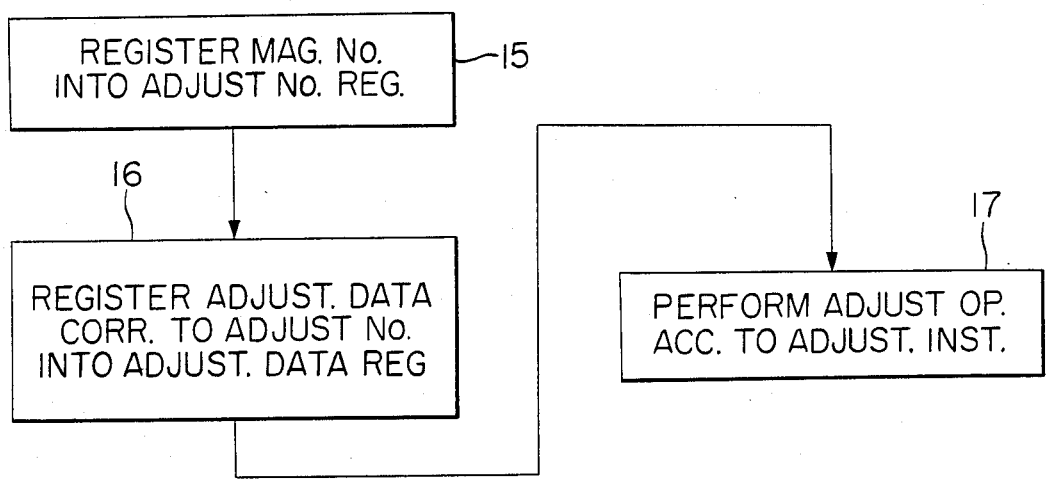
FIG. 7
| MG | T | L(min) | D | E(mm) |
|----|---|--------|---|-------|
| 1  | 1 | 0      | 1 | 17    |
| 2  | 1 | 30     | 2 | 18    |
| 3  | 2 | 20     | 3 | 10    |
| 4  | 1 | 30     | 4 | 15    |
| 5  | 2 | 50     | 5 | 20    |
FIG. 8
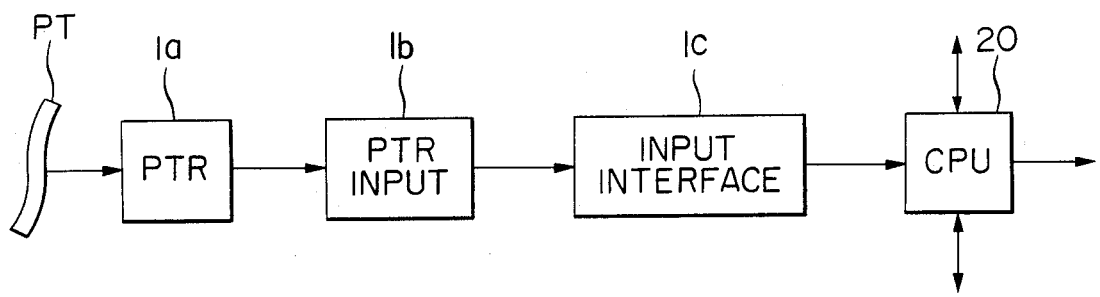

NUMERICAL CONTROL DEVICE

BACKGROUND OF THE INVENTION

1. Field of the Invention

This invention relates to numerical control devices for controlling machine tools, and more particularly to such devices having the function of automatically changing the tools utilized in the machine tools.

2. Description of the Prior Art

Machine tools or machining centers usually comprise tool magazines in which a variety of tools, twenty to forty in number, are held in store, and from which the tool to be used in the machining process is selected one after another by the tool change devices provided in the machine tools. Conventional numerical control devices for such machine tools could automatically select the tool from those held in the magazine, but paid no attention to the remaining life of the tools. Thus, the operators of such machine tools had to judge the remaining life of the tools from the state of the chips or files generated in the machining process, and when he judged there remained no life left for the old tool, had to replace it manually with a new one with accompanying adjustments. Thus, each replacement of old tools necessitated manual operation by the operator, which did not allow the conventional numerical control devices to control the associated machine tools without operator's intervention for a longer period of time.

A conventional numerical control device for machine tools of this type have comprised an input unit for inputting the tool select command, a memory for storing the tool select command as the tool number which is inputted from the input unit, an output unit for outputting the tool number stored in the memory to the machine tool as the magazine number, an arithmetic-logic unit, and a control unit for controlling the operations of the input unit and the memory and the outputting of the tool number from the arithmetic-logic unit to the output unit. The machine tool which is controlled by the numerical control device have comprised a tool change device for changing the tool to be used in the machining process, and the tool selected by the tool change device.

The tool changing operation by this numerical control device is as follows. The tool select command which, for example, is read out of a paper tape by a paper tape reader and is inputted through the input unit is stored in the memory unit as the tool number, and then the tool number is outputted to the output unit as the magazine number through the arithmetic-logic unit. The tool change device of the machine tool selects the tool according to the tool select command upon receiving the magazine number from the output unit, and the tool thus selected performs the machining steps prescribed by the machining program read into the numerical control device.

As the tool number is outputted as the magazine number in the conventional numerical control device as described above, the operator has to change the old tools which have reached the ends of their lives with new ones by visual inspection, for example, when the machine tool is operated by a machining program having the same tool command number for a longer period of time, or is operated continually and repeatedly by the same machining program. Thus, an operator is needed who will inspect the remaining lives of the tools, which results in the disadvantage that the associated machine tool cannot be controlled without operator's intervention for a longer period of time.

SUMMARY OF THE INVENTION

An object of the present invention is to provide a numerical control devices for a machine tool which is free from the disadvantages of the conventional devices as above described, and thus is capable of continuously running the associated machine tool without operator's intervention for a longer period of time.

Another object of the present invention is to provide a numerical control device for a machine tool which is capable of automatically selecting a tool with a remaining life and which is also capable of automatically determining the adjustment or compensation values of the tool.

A further object of the present invention is to provide a numerical control device for a machine tool which can improve the machining precision of the associated machine tool.

A further object of the present invention is to provide a numerical control device for a machine tool which is capable of effecting the automatic tool changing operation when the tool utilized in the machining process reaches the end of life thereof.

A further object of the present invention to provide a numerical control device for a machine tool which is capable of automatically changing the damaged tool upon detection of damage, and then resuming the machining operation of the machine tool after the interruption thereof caused by the damage.

Thus, according to the present invention, a plurality of each kind of tools are mounted in the tool magazines, and the tool numbers and the tool lives corresponding to the magazine numbers are set and registered in the numerical control device, which, utilizing the correspondence between these numbers, automatically selects the tool from the plurality of the same kind of tools held in the magazine specified by the tool select command. The numerical control device according to the present invention is also capable of automatically determining the adjustment value of the tool thus selected, utilizing the adjustment data of the tools which are also registered in the numerical control device.

BRIEF DESCRIPTION OF THE DRAWINGS

The present invention will become more apparent from the following detailed description of the drawings taken in conjunction with the accompanying drawings, in which:

FIG. 6 is a flowchart showing a tool adjustment sub-program stored in a memory of the numerical control device of FIG. 1;

FIG. 7 is a view similar to those of FIGS. 3 and 4, but showing the case in which tool adjustment information is also displayed on the cathode ray tube;

FIG. 8 is a block diagram of an input unit of the numerical control device according to the present invention in which the information corresponding to that displayed on the cathode ray tube of FIGS. 3 and 4 is read into the numerical control device through a paper tape reader;

In the drawings, like reference numerals and characters represent like or corresponding parts.

DETAILED DESCRIPTION OF THE PREFERRED EMBODIMENT

Figure 1:
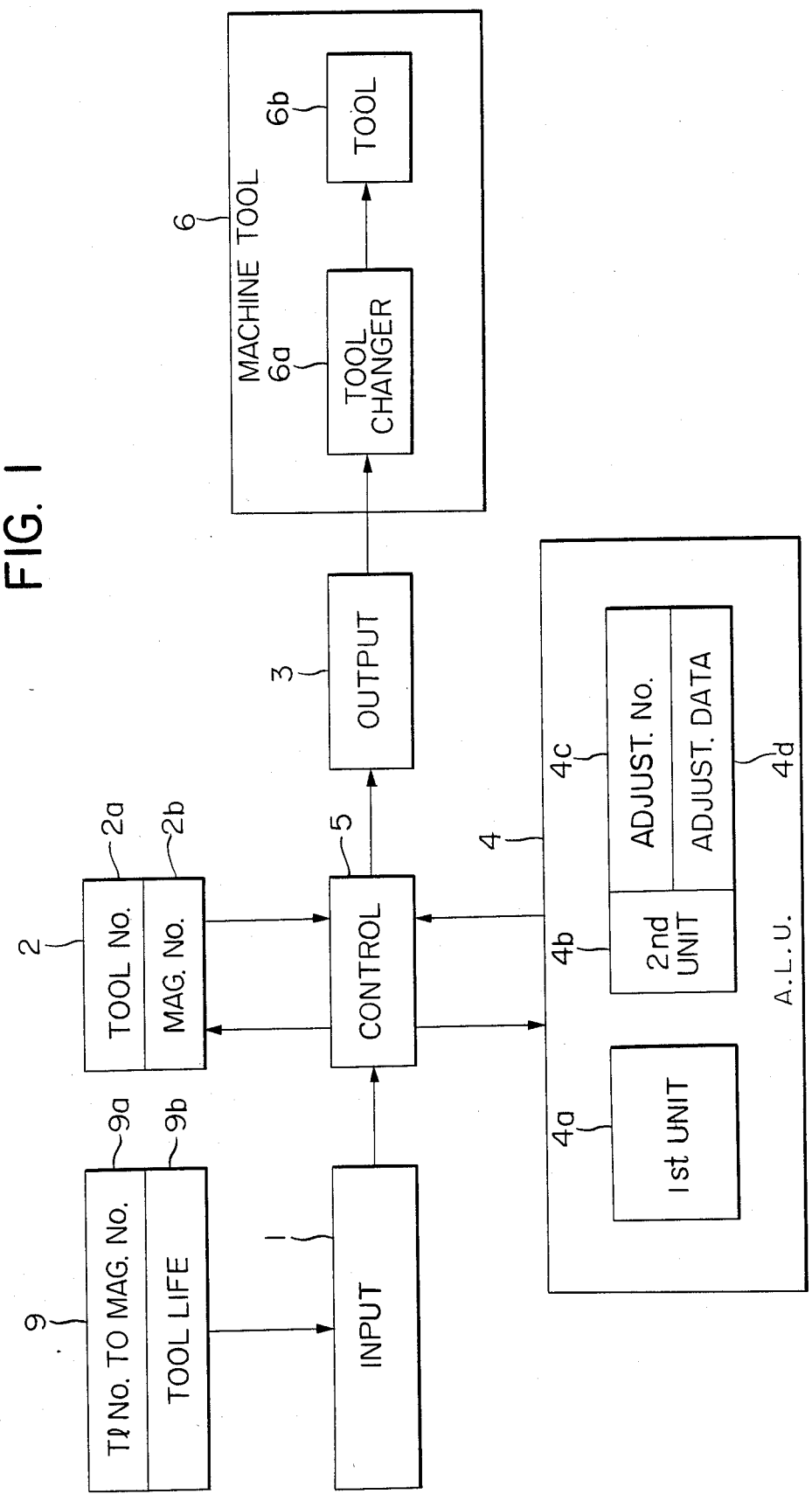
FIG. 1 is a block diagram of a numerical control device for controlling a machine tool according to the present invention.

Referring now to FIG. 1 of the drawings, a first embodiment of the present invention is described.

The numerical control device of FIG. 1 comprises an input unit 1 for inputting a tool select command, a memory 2 which includes a tool number register 2a for registering the tool number specified by the tool select command, and a magazine number register 2b for registering a magazine number corresponding to the tool number which can be used in the machining process. A set-and-display unit 9 of the numerical control device comprises a tool-number-to-magazine-number register 9a for registering the tool numbers with corresponding magazine numbers, and a tool life register 9b for measuring and registering the remaining lives of the tools 6b corresponding to the magazine numbers. The numerical control device of FIG. 1 further comprises an output unit 3 for outputting the magazine number registered in the magazine number register 2b, an arithmetic-logic unit 4, and a control unit 5 for controlling the operations of the input unit 1, the memory unit 2, the arithmetic-logic unit 4, and the output unit 3. The arithmetic-logic unit 4 comprises a first unit 4a for selecting the magazine number which can be used in the machining process, and a second unit 4b which includes an adjustment number register 4c and adjustment data register 4d. The machine tool 6 controlled by the numerical control device comprises a tool change device 6a, and tools 6b selected by the tool change device 6a.

The operation of the numerical control device of FIG. 1 is as follows:

First, a plurality of tools 6b which includes a plurality of species or kinds, each of which is adapted to a specific machining purpose, are mounted to the tool magazine of the machine tool 6, wherein each species of tools comprises a plurality of individual tools 6b. Then, the correspondence between the magazine numbers MG representing the locations or addresses at which individual tools 6b are held in the magazine, and the tool numbers T representing the tool species or kinds and the tool lives L of the individual tools 6b are registered in the set-and-display unit 9. Thus, the numerical values corresponding to the tool numbers T and the tool lives L are registered in the tool-number-to-magazine-number register 9a and the tool life register 9b, respectively, with their correspondence with the associated magazine numbers MG.

Figure 2:
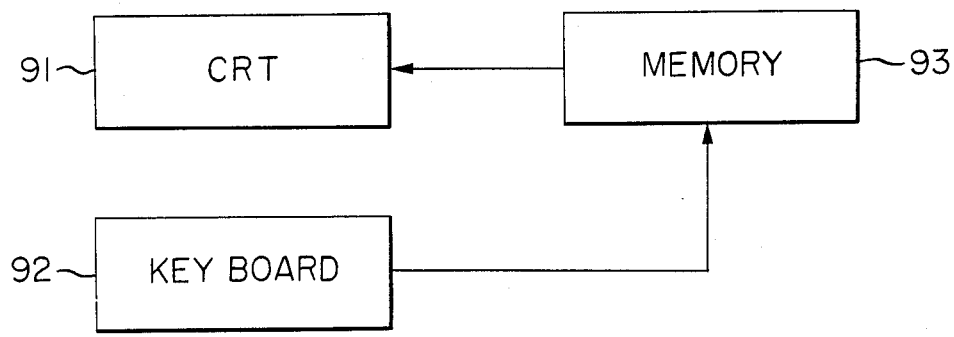
FIG. 2 is a block diagram of a set-and-display unit forming part of the numerical control device of FIG. 1.

FIG. 2 shows a block diagram of the physical construction of the set-and-display unit 9, which comprises a cathode ray tube 91, a key board 92, and a memory 93 comprising the tool-number-to-magazine-number register 9a and the tool life register 9b.

Figure 3:
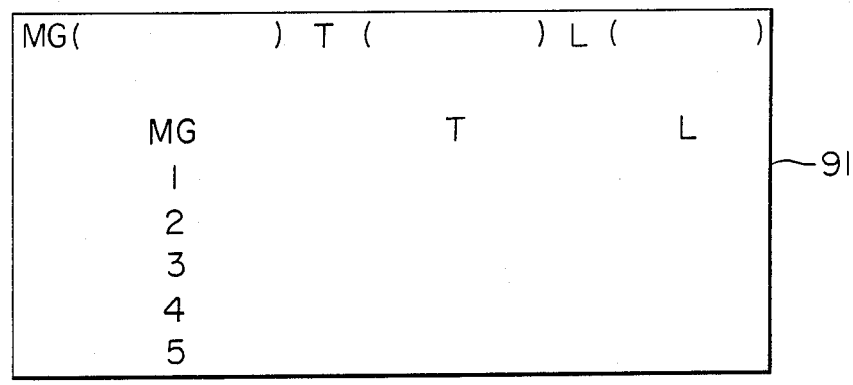
FIG. 3 shows a picture of a cathode ray tube forming part of the set-and-display unit of FIG. 2.
Figure 4:
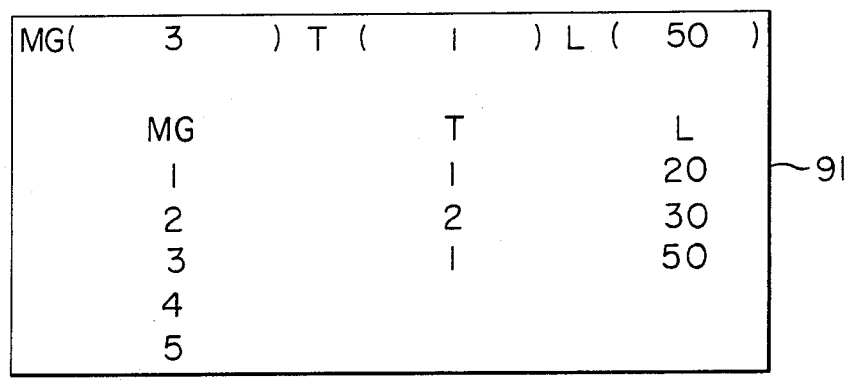
FIG. 4 is a view similar to that of FIG. 3, but showing a picture of the cathode ray tube in the process of registration of the relevant information.

In order to register the above described numerical values in the set-and-display unit 9 of FIG. 2, a display picture as shown in FIG. 3 for registering is displayed on the cathode ray tube 91 by the picture selection key (not shown) disposed on the key board 92. Then, the magazine numbers MG, the tool numbers T, and the tool lives L, are numerically fed into the set-and-display unit through the key board 92. FIG. 4 shows the cathode ray tube 91 in the middle of the registering operation, wherein the tool numbers T and the tool lives L measured in minutes corresponding to the first three magazines having the magazine numbers MG of 1 through 3 are already registered. The numerical values thus fed into the set-and-display unit 9 through the key board 92 are registered in the tool-number-to-magazine-number register 9a and the tool life register 9b in the memory 93. FIG. 4 shows the case in which the tool of the tool species T1 with the tool life L of 20 minutes is disposed in the magazine location having the magazine number MG of 1, the tool of the tool species T2 with the tool life L of 30 minutes in the magazine location having the magazine number MG of 2, and the tool of the tool species T1 with the tool life L of 50 minutes in the magazine location having the magazine number MG of 3. In the similar manner, all the tool numbers T and the tool lives L are registered in the set-and-display unit 9 with their corresponding magazine numbers MG.

When a tool select command specifying a tool number T is inputted through the input unit 1 after the completion of the registering of the tool numbers T and the tool lives L in the set-and-display unit 9, the control unit 5 registers the tool number T specified by the tool select command signal into the tool number register 2a in the memory 2. Furthermore, following the logical steps described hereinbelow in conjunction with FIG. 5, the control unit 5 controls the first unit 4a in the arithmetic-logic unit 4 to determine the magazine number MG of the magazine location at which a tool having the specified tool number T and a remaining tool life L is held, utilizing the contents of the tool-number-to-magazine-number register 9a and the tool life register 9b in the set-and-display unit 9. The control unit 5 then registers the magazine number MG thus determined into the magazine number register 9b in the memory 2, and outputs the magazine number MG thus registered to the output unit 3. The second unit 4b in the arithmetic-logic unit 4 determines the tool adjustment number D and the tool adjustment value E, using the adjustment number register 4c and the adjustment data register 4d in the second arithmetic-logic unit and the tool number register 2a or the magazine number register 2b in the memory 2, according to the logical steps described in detail hereinbelow in conjunction with FIG. 6. The tool adjustment value E thus determined is outputted to the output unit 3 when the adjustment of the tool 6b used in the machining process is performed, so that the adjustment of the tool 6b is effected according to the newly selected adjustment value E applicable to the new tool 6b. Thus, upon receiving the magazine number MG from the output unit 3, the tool change device 6a of the machine tool 6 selects a tool 6b having a remaining life L from among the plurality of the tools of the species corresponding to the tool number specified by the tool select command inputted through the input unit 1. The numerical control device thus can control the associated machine tool 6 without operator's intervention for a longer period of time.

Figure 5:
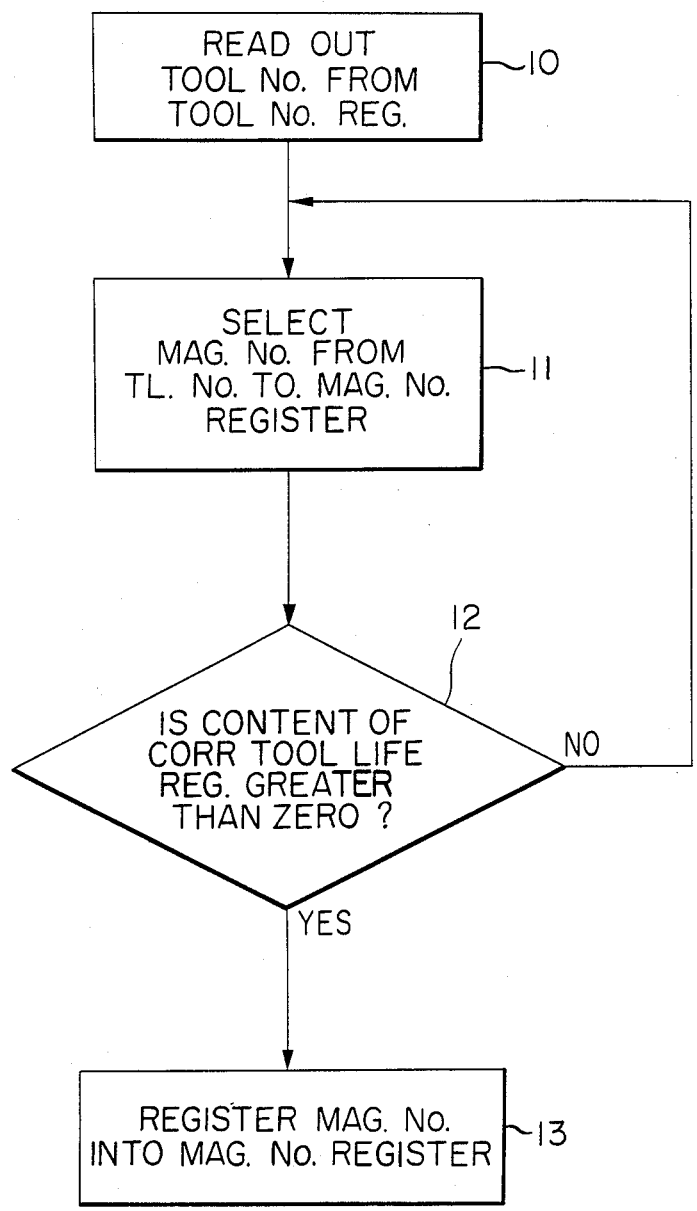
FIG. 5 is a flowchart showing a magazine number selection sub-program stored in a memory of the numerical control device of FIG. 1.

Referring now to FIG. 5 of the drawings, the logical steps which constitutes the magazine number selection sub-program for determining the usable magazine number is described. When a machining operation is performed by the machine tool 6, the tool 6b used in the machining operation is gradually abraded and the remaining life L thereof is shortened accordingly. Thus, the numerical value corresponding to the length of time during which the tool 6b is utilized in the machining process is subtracted from the numerical value L registered in the tool life register 9b which corresponds to the magazine number MG corresponding to the tool 6b used in the machining process. On the other hand, when the tool select command is inputted, the tool number T specified by the tool select command is registered in the tool number register 2a in the memory 2, which is read out by the control unit 5 at step 10. Furthermore, at step 11, the first arithmetic-logic unit 4a selects the smallest magazine number MG from the tool-number-to-magazine-number register 9a from among the magazine numbers MG corresponding to the tool number T stored in the tool number register 2a and read out by the control unit 5 at step 10. At step 12, the control unit 5 reads out the content L of the tool life register 9b corresponding to the magazine number MG determined at the previous step 11, and the first arithmetic-logic unit 4a determines whether or not it is greater than zero. Namely, the first unit 4a determines whether the tool life L of the 6b held in the magazine location having the magazine number MG determined at the step 11 is greater than zero i.e., whether the tool 6b has a remaining life or not. If the answer is affirmative, the magazine number MG determined at step 12 is registered into the magazine number register 2b in the memory 2 at step 13, thereby determining a magazine number MG to which a tool of the specified species with a remaining life corresponds. On the other hand, if the content L of the tool life register 9b corresponding to the active magazine number MG determined at the previous step 11 is determined to be equal to zero at step 12, then the first unit 4a selects the next smallest magazine number from among the magazine numbers MG corresponding to the tool number T registered in the tool number register 2a from the tool-number-to-magazine-number register 9a at the next step 11 following step 12, and then step 12 described above is repeated. Thus, repeating the steps 11 and 12, the smallest magazine number MG of the magazine location at which a tool 6b belonging to the species or kind corresponding to the tool number T specified by the tool select command and having a remaining life L greater than zero is selected by the first arithmetic-logic unit 9a, and the magazine number MG thus determined is registered into the magazine number register 2b, thereby determining the usable magazine number MG. If the first arithmetic-logic unit 4a cannot find any magazine number MG corresponding to the magazine location at which a tool of the specified kind having a remaining life L is disposed, i.e., if none of the tools of the species specified by the tool select command has any remaining life L left, then an alarm signal is generated and the operation of the machine tool 6 is stopped.

Referring now to FIG. 6 of the drawings, the logical steps which constitutes the tool adjustment sub-program for determining the tool adjustment number D and the tool adjustment value E corresponding to the magazine number MG are described. At step 15, the usable magazine number MG which is already registered in the magazine number register 2b in the memory 2 in accordance with the magazine number selection sub-program as described above is registered into the adjustment number register 4c. Next, at step 16, the tool adjustment value E corresponding to the tool adjustment number D registered in the adjustment number register 4c at the previous step 15 is set and registered into the adjustment data register 4d. At step 17, the tool adjustment operation is performed according to the value calculated by the second arithmetic-logic unit 4b from the information stored in the adjustment number and data registers 4c and 4d, in accordance with the tool adjustment instruction which may specify the adjustment number D as well as position data and preparatory functions such as tool diameter adjustment.

FIG. 7 shows the case in which the tool adjustment numbers D and the tool adjustment data E are also displayed in the cathode ray tube 91 in the set-and-display unit 9 in addition to tool numbers T and the tool lives L. In the case illustrated five magazine numbers MG 1 through 5 are displayed in the first column MG, and the corresponding tool numbers T of 1,1, 2, 1, and 2, the remaining lives in minutes L of 0, 30, 20, 30, and 50, the tool adjustment numbers D of 1, 2, 3, 4, and 5, and the tool adjustment values in millimeters E of 17, 18, 10, 15, and 20 are registered and displayed in the subsequent columns T, L, D, and E, respectively. If we assume that the magazine number MG corresponding to the tool which is being used in the machining process is 3, then the numerical values corresponding to the duration of the usage of the tool measured in minutes is subtracted from the remaining life L of 20 corresponding to the magazine number MG of 3. By the way, the tool adjustment number D and the tool adjustment value E corresponding to the magazine number MG 3 are equal to 3 and 10 mm respectively. If the next tool select command inputted from the input unit 1 specifies tool number T equal to 1, the control unit 5 selects the magazine number MG equal to 2 according to the magazine number sub-program described in conjunction with FIG. 5 hereinabove, because the smallest magazine number MG equal to 1 corresponding to the specified tool number T of 1 corresponds to the remaining life L equal to zero. Furthermore, following the tool adjustment sub-program described hereinabove in conjunction with FIG. 6, the tool adjustment number D equal to 2 and the tool adjustment value E equal to 18 are registered into the adjustment number and data registers 4c and 4d respectively. Thus, the second arithmetic-logic unit 4b calculates the adjustment value of the tool corresponding to the magazine number MG equal to 2, and the tool adjustment operation is performed accordingly. Thus, when the tool machine 6 is operated for 30 minutes with the tool corresponding to the magazine number MG of 2, the remaining tool life L corresponding to the magazine number MG of 2 is reduced to zero. When a tool select command specifying the same tool number T of 1 is inputted through the input unit 1 later on, the first arithmetic-logic unit 5 then selects the magazine number MG of 4 according to the magazine number sub-program of FIG. 5, and the adjustment value E of 15 mm corresponding to the adjustment number D of 4 is registered into the adjustment data register 4d with corresponding adjustment number D of 4 which is registered into the adjustment number register 4c, according to the tool adjustment sub-program of FIG. 6. Then, the tool machine 6 is operated with the tool 6b corresponding to the magazine number MG of 4 for 30 minutes.

In the description of the embodiment of FIG. 2 above, the case in which the tool numbers T and the tool lives L corresponding to the magazine numbers MG were set and registered through the key board 92 of the set-and-display unit 9 was taken as an example, but the information T and L can be inputted through the input unit 1. Thus, as shown in FIG. 8, for example, information corresponding to the tool numbers T and the tool lives L with their correspondence with the magazine numbers MG is written into the paper tape PT, which is read out by the paper tape reader 1a and inputted into the central processing unit 20 comprising the control unit 5 and the arithmetic-logic unit 4 of FIG. 1, through the paper tape input unit 1b and the input interface 1c provided in the input unit 1 shown in FIG. 1. The central processing unit 20 then registers and displays the tool numbers T and the tool lives L in the set-and-display unit 9 with their correspondence with the magazine numbers MG.

Thus, as the numerical control device of FIG. 1 comprises a tool-number-to-magazine-number register 9a for registering the tool numbers T with their correspondence with the magazine numbers MG, the tool life register 9b for registering tool lives L with their correspondence with the magazine numbers MG, a first and a second arithmetic-logic units 4a and 4b for determining the usable magazine number MG and the tool adjustment number D and value E, and a magazine number register 2b for registering the magazine number MG determined by the first arithmetic-logic unit 4a, it is capable of automatically selecting the tool 6b of the specified kind which still has a remaining life L, and of automatically performing the adjustment operation of the tool 6b to be used in the next machining step, thereby the associated machine tool 6 can be operated without operator's intervention for a longer period of time.

Although the numerical control device of FIG. 1 automatically selects the tool having a remaining life L by checking the tool lives L which corresponds to the magazine numbers MG corresponding to the tool number T specified by the tool select command inputted through the input unit 1, it does not, however, change the tool 6b which is being used in the machining process when the tool 6b reaches the end of its life during the machining operation. Thus, the tool 6b which has thus reached the end of its life during the usage thereof in the middle of the machining process is used continuously until the next tool select command is inputted through the input unit 1.

This has little adverse effects on the machining process involved, for the durations of the machining steps each of which corresponds to one tool select command are from several seconds to several minutes and the tool lives L registered in the tool life register 9b include some tolerance in practice. It should be admitted, however, that the machining precision may be adversely affected by the resulting over-abrasion of the tool 6b involved.

Furthermore, when the tool 6b still having remaining life L is damaged or broken during the usage thereof in the machining process, the numerical control device of FIG. 1 has to stop the machining operation of the machine tool 6 at once, which necessitates the intervention of an operator.

Figure 9:
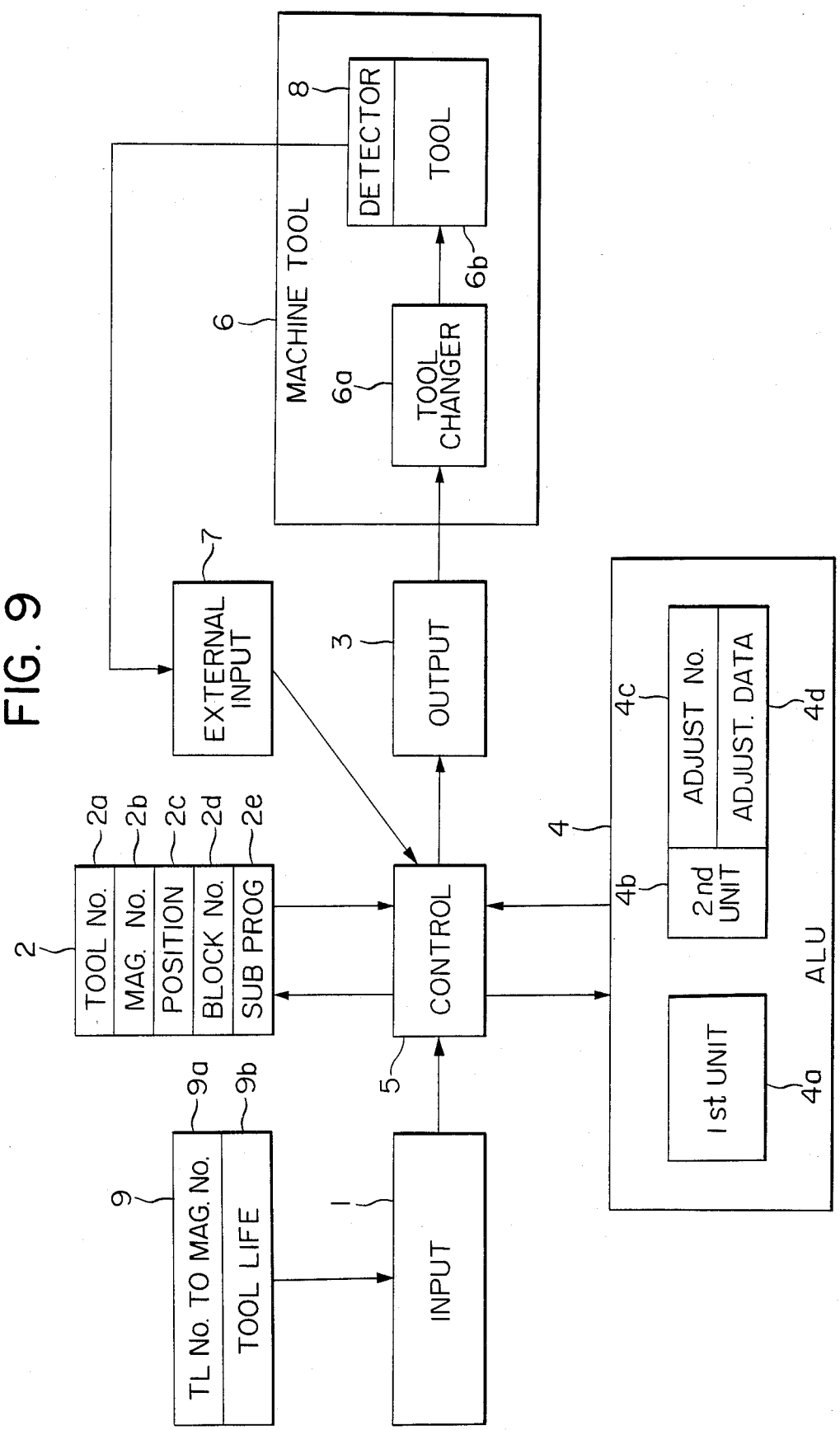
FIG. 9 is a block diagram similar to that of FIG. 1, but showing another embodiment according to the present invention.

Thus, another embodiment of the present invention which is also improved in these respects is described, referring to FIG. 9 of the drawings. Briefly, this second embodiment of the present invention stops the machining operation of the associated machine tool temporarily when the tool being used in the machining operation reaches the end of its life or is damaged in the middle of the machining operation. Then, the position of the tool at which the tool has reached the end of its life or has been damaged and the number of the next block of the machining program are registered and a tool change sub-program stored in the memory is called the steps specified by the tool change sub-program being performed accordingly. Thus, the numerical control device of FIG. 9 can automatically change the tool which has reached the end of its life or has been damaged in the middle of the machining operation, and the associated machine tool can thereby be operated without operator's intervention for a longer period of time.

As shown in FIG. 9, the numerical control device comprises an input unit 1, a memory 2, an output unit 3, an arithmetic-logic unit 4, a control unit 5, and a set-and-display unit 9. The memory 2 comprises a tool number register 2a for registering the tool number T specified by the tool select command inputted through the input unit 1, a magazine number register 2b for registering the magazine number MG which can be used in the machining process, a tool position register 2c for registering the position of the tool at which the tool 6b being used in the maching process reaches the end of its life or is damaged in the middle of the machining operation, a block number register 2d for registering the number N of the block of the machining program next to the one which is being executed at the time when the tool 6b reaches the end of its life or is damaged in the middle of the machining operation, and a sub-program memory domain 2e in which a tool change sub-program as described in detail hereinbelow is stored as well as the magazine number selection and the tool adjustment sub-programs described hereinabove in conjunction with FIGS. 5 and 6. The set-and-display unit 9 comprises a tool-number-to-magazine-number register 9a for registering tool numbers T corresponding to the magazine numbers MG and a tool life register 9b for measuring and registering the remaining tool lives L of the tools 6b, and has a physical construction similar to that shown in FIG. 3. The output unit 3 outputs the magazine number MG registered in the magazine number register 2b to the tool change device 6a of the machine tool 6. The arithmetic-logic unit 4 comprises a first unit 4a for selecting the magazine number MG according to the magazine number selection sub-program stored in the sub-program memory domain 2e, and a second unit 4b comprising an adjustment number register 4c and an adjustment data register 4d which determines the tool adjustment values according of the tool adjustment sub-program stored in the sub-program memory domain 2e. The numerical control device further comprises a damage detector 8 for detecting an occurence of damage to the tool 6b which is being used in the machining process, and an external signal input unit 7 for inputting the damage signal generated by the damage detector 8 upon a detection of an occurence of damage to the tool 6b in use. The control unit 5 controls the input, the memory the arithmetic-logic, and the output operations of the associated units. The tool damage detector 8 can be any one of conventional devices for detecting an occurence of damage to the tool 6b, such as an ultra-sonic detector or a cutting resistance detector.

The operation of the numerical control device of FIG. 9 is as follows.

First, as in the case of the numerical control device of FIG. 1, a plurality of tools 6b including a plurality of species or kinds are disposed in the magazine, wherein each of the species of the tools comprising a plurality of individual tools 6b. Then, the tool numbers T and the tool lives L are registered into the set-and-display unit 9 with their correspondence with the magazine numbers MG which represents the magazine location at which individual tools 6b are held in store. Thus, the information corresponding to the tool numbers T and lives L are registered into the tool-number-to-magazine-number register 9a and the tool life register 9b in the set-and-display unit 9. Next, when the tool select command is inputted through the input unit 1, the control unit 5 registers the tool number T specified by the tool select command into the tool number register 2a in the memory 2. Furthermore, the magazine number MG to which a tool 6b usable in the machining process corresponds is determined by the first arithmetic-logic unit 4a, with the help of the information stored in the tool-number-to-magazine-number register 9a and the tool life register 9b and that stored in the tool number register 2a in the memory 2. The second arithmetic-logic unit 4b determines the adjustment value E of the newly selected tool 6b according to the tool adjustment subprogram with the help of adjustment number register 4c and the adjustment data register 4d and of the tool number register 2a or magazine number register 2b in the memory 2. Thus, the tool adjustment operation is performed according to the newly selected adjustment value E which is adapted to the newly selected tool 6b.

Furthermore, the content of the tool life register 9b corresponding to the tool life L of the tool 6b which is being used in the machining process is repeatedly checked during the operation of the machine tool 6, and when it is determined to be equal to zero, i.e., when the tool 6b in use has reached the end of its life in the middle of the machining operation, the machining operation of the machine tool 6 is stopped through the control unit 5. At the same time, the data corresponding to the position of the tool 6b at which the tool 6b has reached the end of its life, and the number of the block of the machining program which is next to the block being executed at the time when the tool 6b has reached the end of its life, are registered into the position register 2c and the block number register 2d in the memory 2 respectively. Furthermore, as described in detail hereinbelow in conjunction with FIG. 11, the tool change sub-program is called out from the sub-program memory domain 2e, and the old tool 6b which has reached the end of its life is replaced with a new one still having a remaining life at the time point when the old tool 6b has reached the end of its life. Thus, the disadvantage that the old tool 6b having no remaining life is continuously used in the machining process until the next tool select command is inputted is avoided.

When, on the other hand, the tool 6b being used in the machining process is damaged in the middle of the machining operation, the damage detector 8 detects the occurence of damage to the tool 6b in use and generates a damage signal which is applied to the external signal input 7. Upon receiving the damage signal through the external signal input 7, the control unit 5 clears and reduces the content of the tool life register 9b to zero which corresponds to the tool 6b in use. Thus, just as in the case in which the tool 6b in use reaches the end of its life in the middle of the machining operation, the damaged tool 6b is automatically changed with a new one following the same steps as described above. The associated machine tool 6, therefore, can be restarted after a temporary interruption without operator's intervention.

Figure 10:
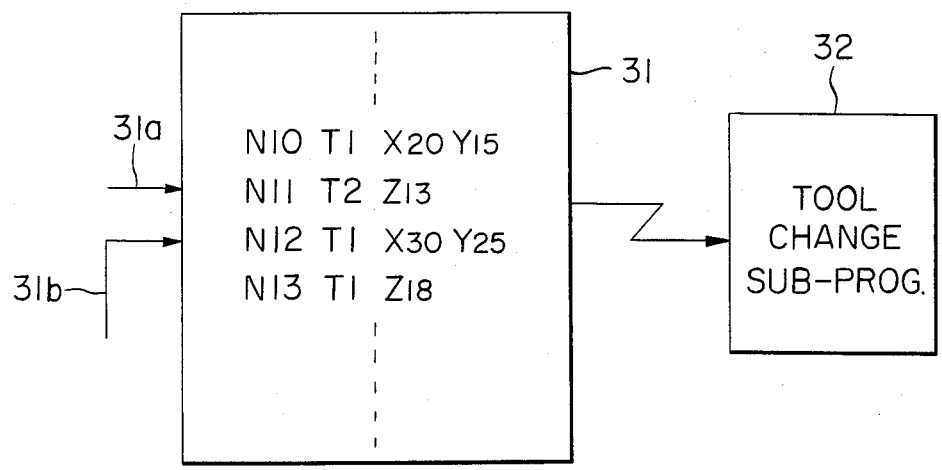
FIG. 10 shows schematically the relationship between the main machining program and the tool change sub-program according to the present invention.
Figure 12:
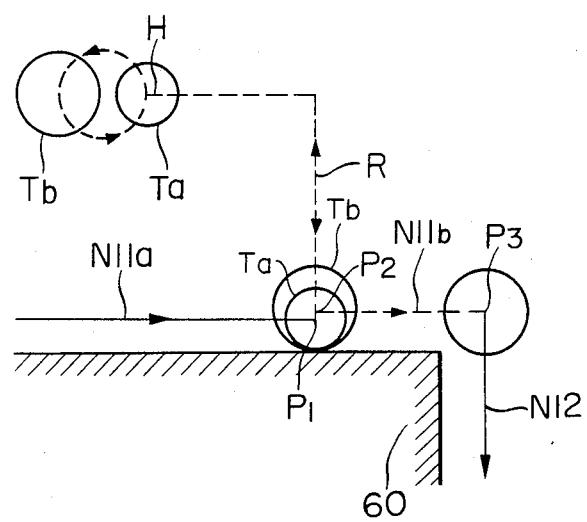
FIG. 12 is a schematic side view of the old and new tools of the associated machine tool showing the tool changing operation according to the present invention.
Figure 11:
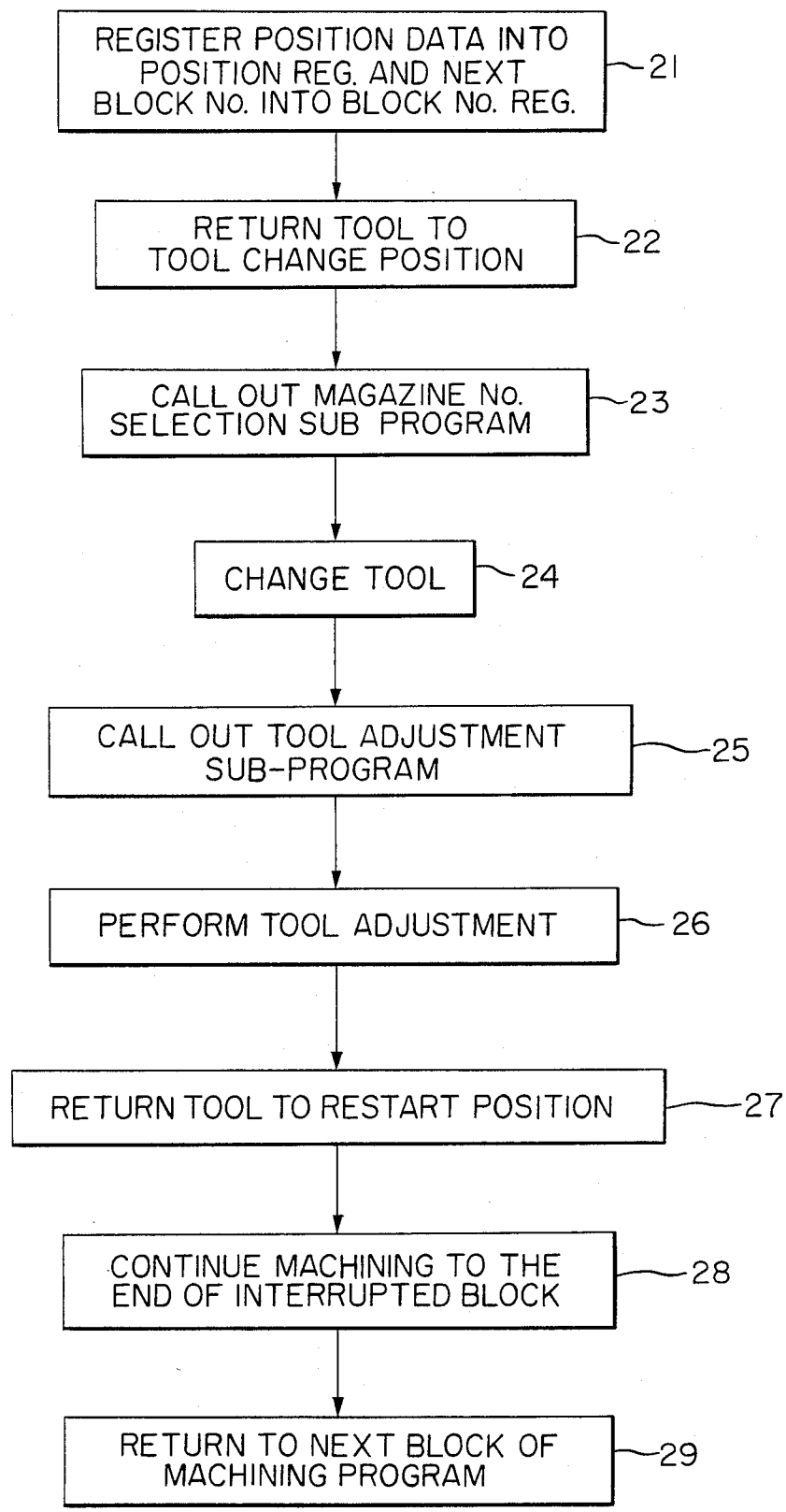
FIG. 11 is a flowchart showing the tool change sub-program stored in the memory of the numerical control device of FIG. 9.

Referring now to FIGS. 10 to 12 of the drawings, the tool changing operation of the numerical control device of FIG. 9 is described.

Each block of the main or machining program 31 which is represented by a row in FIG. 10 specifies, for example, a block number N, the tool number T, and the position of the work piece in cartesian coordinates X, Y, and Z, etc., of each machining step corresponding thereto. The main program 31 is read into the numerical control device through a paper tape reader 1a, for example, and the machining steps specified by the blocks of the main program 31 is sequentially performed by the machine tool 6 controlled by the numerical control device. Thus, when the block having the block number N11 shown at the arrow 31a is performed, the tool Ta of the tool species T1 performs the machining operation on the work piece 60 along the solid line N11a specified by the block N11 as shown in FIG. 12. Suppose, however, that the tool Ta reaches the end of its life or is damaged at the position P1. Then, as described above, the content of the tool life register 9b corresponding to the tool Ta is cleared to zero, and the machining operation of the machine tool 6 is stopped. At the same time, the tool change sub-program 32 is called from the subprogram memory domain 2e and the tool changing operation is performed accordingly.

Thus, at step 21 of FIG. 11, the tool return sub-program is called from the domain 2e in the memory 2 and the data corresponding to the position P1 of the tool Ta at which the tool Ta has reached the end of its life or is damaged is registered into the position register 3c in the memory 2, and the number N12 of the block of the machining program next to the block N11 which is being excuted when the tool has reached the end of its life or is damaged is registered into the block number register 2d according to the tool return sub-program. At the next step 22, the tool Ta which has been in use is returned to the tool change or home position H thereof along the dotted line R according to the tool return sub-program. Next, at step 23, the magazine number selection sub-program is called which was described hereinabove in conjunction with FIG. 5, and a usable magazine number MG is selected by the first arithmetic-logic unit 4a accordingly and outputted through the output unit 3 to the tool change device 6a of the machine tool 6. At step 24, the tool change device 6a changes the old tool Ta with a new one Tb of the same species T1 which corresponds to the magazine number MG selected at step 23. Furthermore, at step 25, the tool adjustment sub-program is called which was described hereinabove in conjunction with FIG. 6, and the adjustment value adapted to the new tool Tb is determined by the second arithmetic-logic unit 4b accordingly. At the following step 26, the adjustment of the new tool Tb is effected according to the new adjustment value thus determined at step 25. Then, at step 27, the new tool Tb is returned along the dotted line R to the restart position P2 which coincides with the position P1, at which the old tool Ta has reached the end of its life or is damaged, save for the adjustment value, according to the data registered in the position register 2c at step 21. At step 28, the machining step corresponding to the block N11 is resumed and the remaining portion thereof is completed along the dotted line N11b to the point P3. At step 29, the control is returned to the next block N12 shown at the arrow 31b of the main program 31 and the machining operation of the machine tool 6 is continued accordingly.

In the description of the numerical control device of FIG. 9 above, the case in which the content of the tool life register 9b is cleared to zero by the damage signal applied through the external input 6 was described. It can, however, be cleared through the set-and-display unit 9 or input unit 1 with the same result.

What is claimed is:

1. A numerical control device comprising:
   an input means for inputting a tool select command for commanding a selection of a tool to be used in a machining process from a plurality of tools each mounted at a corresponding magazine location;
   a tool number register means for storing said tool select command as a tool number;
   a tool-number-to-magazine-number register means for registering tool numbers correlated with corresponding magazine numbers, each of the magazine numbers corresponding to a magazine location;
   a tool life register means for storing tool lives correlated with the corresponding magazine numbers;
   a first calculator means for determining a magazine number of a magazine location at which a usable tool having a remaining life is mounted in response to a tool number stored in said tool number register means and in response to the contents of said tool-number-to-magazine-number register means and said tool life register means;
   a magazine number register means for storing said magazine number determined by said fisrt calculator means;
   an adjustment number register means for registering tool adjustment numbers correlated with the coresponding magazine numbers;
   an adjustment data register means for registering tool adjustment values correlated with the corresponding adjustment numbers;
   a second calculator means for calculating a tool adjustment value in response to the magazine number stored in said magazine number register means and in response to the contents of said adjustment number register means and the adjustment data register means; and
   output means for outputting said magazine number stored in said magazine number register means and said tool adjustment value calculated by said second calculator means.

2. A numerical control device as claimed in claim 1, wherein said tool life register means comprises means for decrementally reducing the tool life corresponding to a tool in use in proportion to the length of time during which said tool in use is used in a machining step.

3. A numerical control device as claimed in claim 1, wherein said first calculator means comprises means for determining whether the tool lives are greater than zero in the order of increasing magazine numbers.

4. A numerical control device as claimed in claim 1, wherein said adjustment data register means comprises means for storing adjustment values of the tools with respect to the corresponding magazine locations for machining a work piece in a predetermined manner.

5. A numerical control device as claimed in claim 4, wherein said adjustment values are stored in terms of lengths.

6. A numerical control device comprising:
   an input means for inputting a tool select command for commanding a selection of a tool to be used in a machining process from a plurality of tools each mounted at a corresponding magazine location;
   a tool number register means for storing said tool select command as a tool number;
   a tool-number-to-magazine-number register means for registering tool numbers correlated with corresponding magazine numbers, each of the magazine numbers corresponding to a magazine location;
   a tool life register means for storing tool lives correlated with the corresponding magazine numbers;
   a first calculator means for determining a magazine number of a magazine location at which a usable tool having a remaining life is mounted in response to a tool number stored in said tool number register means and in response to the contents of said tool-number-to-magazine-number register means and said tool life register means;
   a magazine number register means for storing said magazine number determined by said first calculator means;
   an adjustment number register means for registering tool adjustment numbers correlated with the corresponding magazine numbers;
   an adjustment data register means for registering tool adjustment values correlated with the corresponding adjustment numbers;
   a second calculator means for calculating a tool adjustment value in response to the magazine number stored in said magazine number register means and in response to the contents of said adjustment number register means and the adjustment data register means;
   output means for outputting said magazine number stored in said magazine number register means and said tool adjustment value calculated by said second calculator means;
   a position register means for storing a tool position of a tool in use when the tool in use becomes incapable of machining; and
   a tool change sub-program means for effecting a tool change when the tool in use becomes incapable of machining, and for restarting the machining operation from the tool position stored in said position register means.

7. A numerical control device as claimed in claim 6, further comprising a block number register means for storing a block number of a main program which is next to a block number of a block of said main program that is being performed at the time when the tool in use becomes incapable of machining.

8. A numerical control device as claimed in claim 7, further comprising an external signal input means for inputting a signal from a tool damage detector means for detecting an occurrence of damage to the tool in use.

9. A numerical control device as claimed in claim 8, wherein said tool damage detector means comprises an ultrasonic detector.

10. A numerical control device as claimed in claim 8, wherein said tool damage detector means comprises a cutting resistance detector which detects the cutting resistance of the tool in use.

11. A numerical control device as claimed in claim 8, further comprising a clearing means for clearing to zero the content of the tool life register means corresponding to the magazine number corresponding to the tool in use upon receiving said signal from said external signal input means, and means responsive to the clearing means for activating said tool change sub-program means.

12. A numerical control device as claimed in claim 11, further comprising a means for activating said tool change sub-program means when said content of the tool life register means corresponding to the magazine number corresponding to the tool in use is equal to zero.

13. A numerical control device as claimed in claim 7, wherein said tool change sub-program means comprises a means for activating said position register and block number register means to store said tool position and block number respectively when said tool in use becomes incapable of machining, a means for returning said tool in use to a tool change position, a means for activating said first calculator means to determine said magazine number, a means for outputting said magazine number determined by said first calculator means to said output means, and a means for restarting machining operation from said tool position stored in said position register means.

14. A numerical control device as claimed in claim 13, wherein said tool change sub-program means comprises means for activating said second calculator means to calculate said tool adjustment value.

15. A numerical control device as claimed in claim 6, wherein said first calculator means comprises means for activating said tool change sub-program means by determining that a tool in use has reached the end of its life thereof.

16. A numerical control device as claimed in claim 6, further comprising a key board means for inputting said tool numbers and tool lives correlated with respective corresponding magazine numbers into said tool-number-to-magazine-number register means and said tool life register means respectively, and a cathode ray tube means for displaying said tool numbers and said tool lives correlated with said corresponding magazine numbers.

* * * * *